Figure 1:
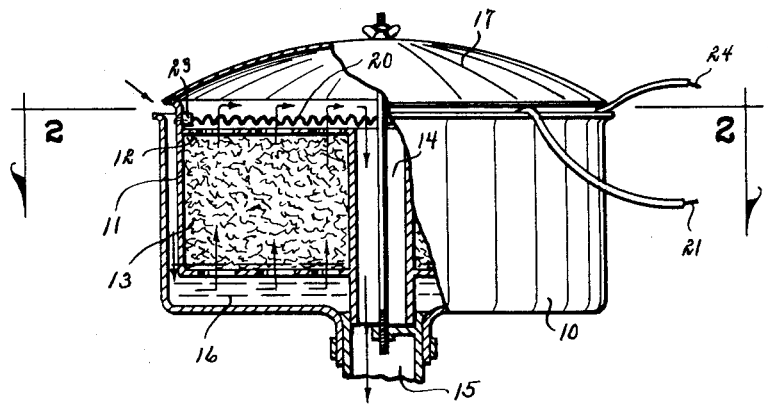

Sept. 29, 1959  J. P. SPAL  2,906,848
METHOD OF AND MEANS FOR INCREASING THE EFFICIENCY
OF INTERNAL COMBUSTION ENGINES
Filed May 7, 1958

INVENTOR.
John Peter Spal
BY.
M. Talbert Dick
ATTORNEY.

Witness.
A. S. Martin.

United States Patent Office 2,906,848
Patented Sept. 29, 1959

2,906,848

METHOD OF AND MEANS FOR INCREASING THE EFFICIENCY OF INTERNAL COMBUSTION ENGINES

John Peter Spal, Fort Dodge, Iowa

Application May 7, 1958, Serial No. 733,659

1 Claim. (Cl. 219—38)

This invention relates to a method of and means for increasing the efficiency of internal combustion engines and more particularly to a method and means that will ensure better combustion of the fuel inside the combustion chambers of the engine.

Many efforts have been made to improve the power, flexibility, fuel consumption and efficiency of gasoline fueled motors. Usually such methods have either embraced carburetor structure, motor heat controls such as thermostatic valves in the water cooling system, and the preheating of the fuel charge just prior to its entry into the engine cylinders. Such preheating methods have followed two paths, either the intake manifold was heated by the engine exhaust or heated by the hot water of the cooling system. In either case, the engine had to be operated a substantial length of time before the heat means could be brought into play. Also, because the air was carrying many unvaporized particles of fuel, much raw gasoline entered the combustion chambers even if the intake manifold was embraced by a heating means and, obviously, the heating means could not be placed inside the intake manifold without seriously reducing the manifold capacity.

Therefore, one of the principal objects of my invention is to provide a means for heating the air before it enters into and engages the fuel particles in the engine carburetor.

A further object of this invention is to provide a device that is capable of preheating the air prior to its entry into the carburetor, and prior to the starting of the engine.

A still further object of my invention is to provide a method of increasing the mileage per gasoline gallon of an automotive vehicle using an internal combustion engine.

A still further object of this invention is to provide a means for increasing the combustion efficiency of an internal combustion engine whereby the engine will be more powerful, the engine oil will not become diluted by unburned gasoline, and carbon soot will be greatly reduced in the muffler and in the exhaust exiting from the muffler.

A still further object of this invention is to provide a method of insuring a clean engine, thereby extending the life of the engine parts and particularly the piston rings and spark plugs.

A still further object of my invention is to provide a method of obtaining better combustion in engines thereby reducing piston knock and reducing wear and tear on the engine bearings.

A still further object of this invention is to provide a device for successfully preheating the fuel charge of an internal combustion engine that does not reduce the capacity of the intake manifold of the engine.

Still further objects of my invention are to provide a method of and means for increasing the efficiency of internal combustion engines that is economical in manufacture and durable in use.

These and other objects will be apparent to those skilled in the art.

Figure 2:
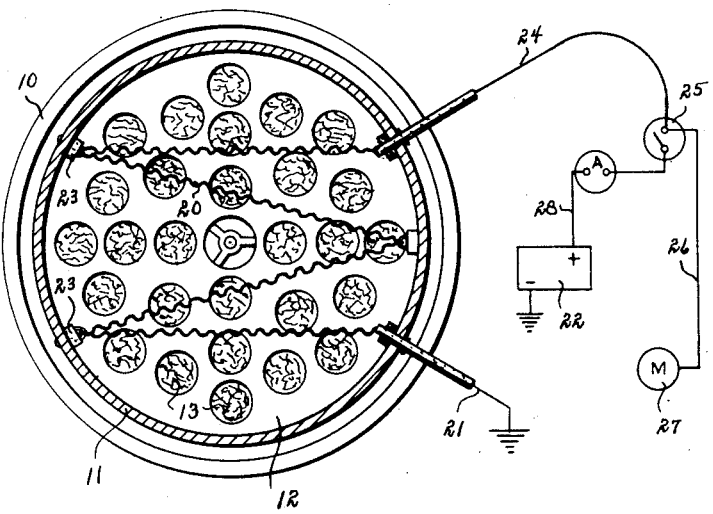

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a side view of an air filter of a carburetor of an internal combustion engine with my device installed therein, and with sections cut away to more fully illustrate its construction, and Fig. 2 is a top plan sectional view showing my device installed in an air filter of an engine carburetor and is taken on line 2—2 of Fig. 1.

My method is to use an electrically heated resistance wire in the air stream before the air stream enters the inside of the carburetor whereby the air column will be a hot air column at the time the gasoline particles are sprayed into the column. Obviously, by such an arrangement, the fuel particles will all readily gasify and the fuel charge entering into the combustion chambers of the engine will be in the form of a combustible gas instead of atomized gasoline droplets. The source of electricity is from the storage battery of the engine and/or engine generator. The circuit is through the motor key switch so that when the key is turned to "on" and prior to bringing the self-starter into usage, the resistance wire will draw energy from the battery and heat the air inside the carburetor air filter.

In the drawings I have used the numeral 10 to designate the air filter housing. The numeral 11 designates the inside bowl of the air filter having dimensions substantially less than that of the housing as shown in Fig. 1. This bowl has an upper perforated plate 12 and its bottom is perforated. The numeral 13 designates steel wool or like in the bowl and between its inside bottom and the plate 12. The numeral 14 designates a centrally located vertically downwardly extending pipe conduit extending at its upper end through the plate and having its lower end communicating with the inside of the air intake pipe 15 of a carburetor. In the bottom area of the housing 10 is a volume of oil 16. The numeral 17 designates a detachable lid on the bowl 11. The air is sucked downwardly between the inside wall of the housing and the outside wall of the bowl, thence through the oil bath, thence upwardly through the perforated bottom of the bowl, thence through the steel wool, thence through the perforated plate 12, thence into the upper portion of the bowl, thence downwardly through the pipe conduit 14, and thence into the carburetor intake pipe 15.

Such an air filter is in common usage on almost all internal combustion engines. The structure may differ but the general principle is the same. As herebefore indicated I install a resistance wire 20, calrod or like in the air filter. The heating element may be secured in the upper area of the bowl by any suitable means. One end of the resistance wire is grounded and this may be accomplished by grounding it onto the metallic air filter, or a lead wire 21 may be extended to the minus terminal of the storage battery 22. The resistance wire may be placed in any pattern above the plate 12 and held by being secured to insulation blocks 23 secured to the inside of the bowl as shown in Fig. 2. The other end of the resistance wire is connected to a lead wire 24 that is in turn connected to the open contact point of the switch 25. Also connected to this open contact point is the usual lead wire 26 extending to the motor 27. The lead wire 28 operatively connects the positive side of the battery to the other contact point of the switch. By this arrangement when the switch 25 (which is the key operated switch of the motor) is closed, the resistance wire will immediately heat up, thereby heating the air between the bowl lid and the perforated plate 12. Therefore, when the switch of the self-starting mechanism of the engine is closed, the hot air will pass immediately and directly through the pipe conduit into the carburetor. This means immediate and easy starting of the engine even in cold weather. With the engine turning over, new air will be drawn up through the perforations of the plate 12, heated, and then introduced into the carburetor and this process is continuous until the engine is turned off. Thus whenever the switch is turned on the heating of the air in the air filter will be automatic and continuous until the switch is turned off. The only adjustment to the motor that is necessary after the installation is that the carburetor must be leaned out. The engine with my device will successfully idle much slower than herebefore due to the fuel charge being completely gasified. The engine will operate smoothly and without engine knock. It will accelerate faster than without my air heating device. The combustion will be most complete and therefore most carbon deposits will be eliminated. By placing the heating unit in the air filter the capacity of the carburetor, engine manifold and like is not affected.

Some changes may be made in the construction and arrangement of my method of and means for increasing the efficiency of internal combustion engines without departing from the real spirit and purpose of my invention, and it is my intention to cover by my claims, any modified forms of structure or use of mechanical equivalents which may be reasonably included within their scope.

I claim:

In combination, an air filter housing having an open top and a bottom, a bowl in said housing having a diameter less than that of the diameter of said housing and positioned above the inside bottom of said housing; said bowl having its bottom perforated and said housing adapted to contain oil in its bottom portion, a perforated plate in the upper portion of said bowl, metal fiber filtering material in said bowl and below said perforated plate, a pipe means extending downwardly through said bowl and said housing having one end communicating with the area above said perforated plate and its other end adapted to communicate with the carburetor of an internal combustion engine, a lid on said bowl, an electrically heated element in said bowl and above said perforated plate, and electrical wiring electrically connected to said electrically heated element and adapted to be electrically connected to a source of electrical energy.

References Cited in the file of this patent

UNITED STATES PATENTS

| | | |
|---|---|---|
| 2,129,571 | Driscoll | Sept. 6, 1938 |
| 2,177,840 | Roualet | Oct. 31, 1939 |
| 2,610,282 | Brownell | Sept. 9, 1952 |